(12) United States Patent
Paulin et al.

(10) Patent No.: US 9,357,707 B1
(45) Date of Patent: Jun. 7, 2016

(54) METHOD FOR HARVESTING A BLUEBERRY FIELD

(71) Applicants: Daniel Paulin, Petit-Rocher (CA); Eric Paulin, Petit-Rocher (CA)

(72) Inventors: Daniel Paulin, Petit-Rocher (CA); Eric Paulin, Petit-Rocher (CA)

( * ) Notice: Subject to any disclaimer, the term of this patent is extended or adjusted under 35 U.S.C. 154(b) by 0 days.

(21) Appl. No.: 14/544,866

(22) Filed: Feb. 27, 2015

(51) Int. Cl.
*A01D 46/22* (2006.01)
*A01D 46/00* (2006.01)

(52) U.S. Cl.
CPC ........... *A01D 46/22* (2013.01); *A01D 46/00* (2013.01)

(58) Field of Classification Search
CPC ..... A01D 46/22; A01D 46/20; A01D 46/253; A01D 46/00
USPC .......................................... 56/328.1, DIG. 2
See application file for complete search history.

(56) References Cited

U.S. PATENT DOCUMENTS

| | | | |
|---|---|---|---|
| 2,037,624 A | 4/1936 | Franklin | |
| 2,743,826 A * | 5/1956 | Aschenwald | A24B 3/12 131/306 |
| 2,795,099 A | 6/1957 | Getsinger | |
| 3,485,026 A * | 12/1969 | Davis | A01D 46/20 D46/328.1 |
| 3,616,630 A | 11/1971 | Gray et al. | |
| 3,648,447 A | 3/1972 | Burton | |
| 3,724,168 A | 4/1973 | Cassady, Jr. et al. | |
| 3,841,071 A * | 10/1974 | Pinkham | A01D 45/16 56/27.5 |
| 3,955,343 A * | 5/1976 | Tico | A01D 46/00 414/403 |
| 4,279,188 A * | 7/1981 | Scott | G10H 3/146 338/114 |
| 4,332,128 A * | 6/1982 | Prince | A01D 45/16 56/218 |
| 4,828,040 A * | 5/1989 | Schumacher | A01B 45/045 172/19 |
| 4,862,683 A | 9/1989 | Bragg et al. | |
| 5,024,052 A * | 6/1991 | Bragg | A01D 46/00 56/330 |
| 5,369,944 A | 12/1994 | Robichaud | |
| 5,375,403 A | 12/1994 | Collins et al. | |
| 6,000,203 A * | 12/1999 | Weatherbee | A01D 46/00 56/14.9 |
| 6,854,255 B1 * | 2/2005 | Emerson | A01D 46/00 56/330 |
| 7,716,909 B2 | 5/2010 | Hebert | |
| 7,882,686 B2 * | 2/2011 | Bryan, Jr. | A01D 46/243 414/503 |
| 8,635,845 B1 * | 1/2014 | Palm | A01D 46/28 56/328.1 |
| 2015/0089913 A1 * | 4/2015 | Maisonneuve | A01D 51/002 56/14.7 |

FOREIGN PATENT DOCUMENTS

| CA | 1249727 | 2/1989 |
|---|---|---|
| CA | 1318135 | 5/1993 |

* cited by examiner

*Primary Examiner* — John G Weiss
(74) *Attorney, Agent, or Firm* — Mario Theriault

(57) ABSTRACT

The method for harvesting a blueberry field comprises the steps of carrying a number of empty blueberry containers on a first pair of lower arms of four-arm lift assembly of a blueberry harvester; transferring a first empty blueberry container onto a second pair of lower arms of the lift assembly; filling the first blueberry container with blueberries, and depositing the first blueberry container on the ground as soon as it is full. The steps of transferring, filling and depositing are repeated with each of the empty blueberry containers carried on the lift assembly of the harvester.

20 Claims, 3 Drawing Sheets

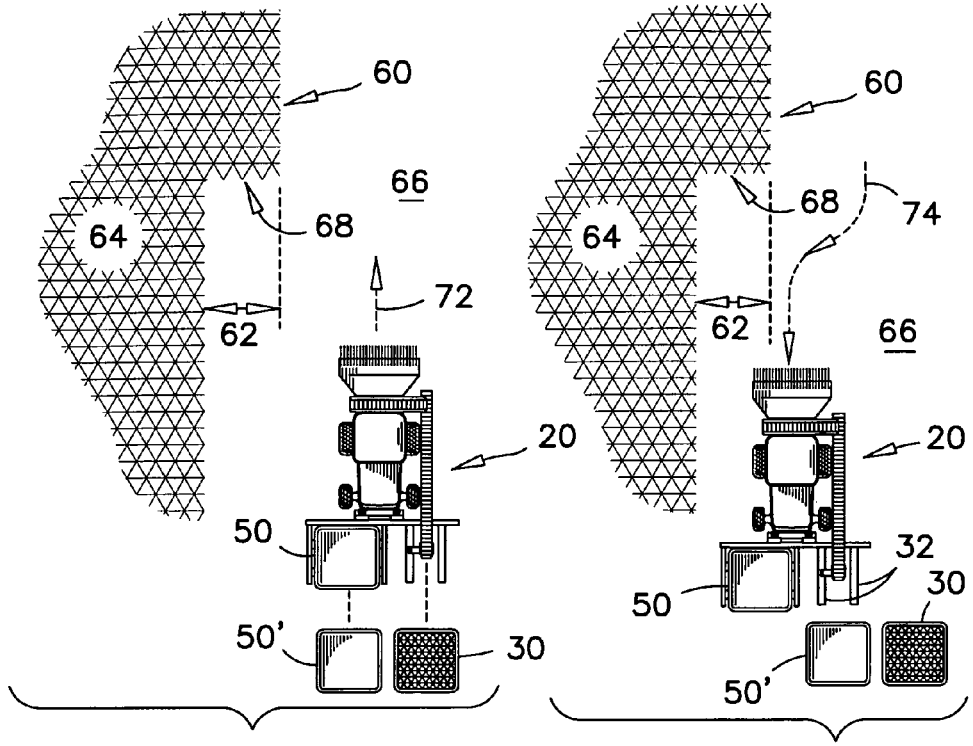
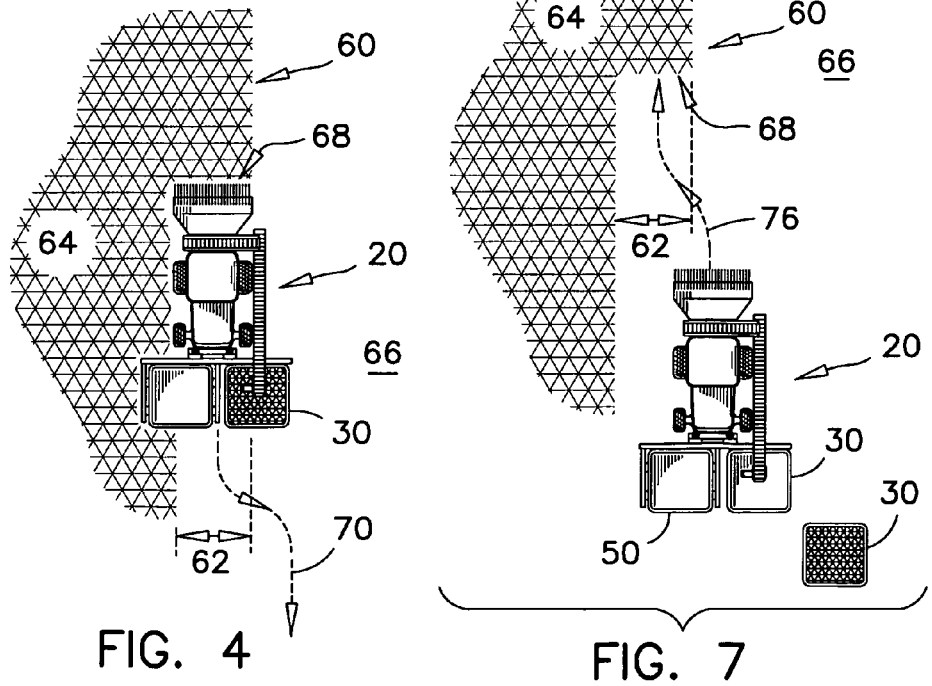

METHOD FOR HARVESTING A BLUEBERRY FIELD

FIELD OF THE INVENTION

This invention pertains to commercial blueberry harvesting methods, and more precisely the present invention pertains to the handling of blueberry containers in a blueberry harvesting operation.

BACKGROUND OF THE INVENTION

In a common commercial blueberry harvesting operation, the harvesters are mounted to relatively large farm tractors. Generally, a platform is provided on the back of the tractor to carry a number of empty blueberry containers and a number of full blueberry containers. The full blueberry containers are carried on the platform until most or all the blueberry containers are full. The harvester is then driven to the edge of a field where the containers are unloaded and transferred to a flat bed truck for example and carried to a warehouse or a processing plant.

Upon unloading the full blueberry containers to a shuttle truck, the harvester is reloaded with empty blueberry containers and harvesting is resumed.

For reference purposes, examples of blueberry and cranberry harvesters of the prior art are identified in the following publications:

U.S. Pat. No. 2,037,624 issued to H. J. Franklin on Apr. 14, 1936;
U.S. Pat. No. 2,795,099 issued to L. C. Getsinger on Jun. 11, 1957;
U.S. Pat. No. 3,616,630 issued to G. L. Gray et al. on Nov. 2, 1971;
U.S. Pat. No. 3,648,447 issued to C. G. Burton on Mar. 14, 1972;
U.S. Pat. No. 3,724,168 issued to H. W. Cassady Jr. et al. on Apr. 3, 1973;
U.S. Pat. No. 4,862,683 issued to R. D. Bragg et al. on Sep. 5, 1989;
U.S. Pat. No. 5,024,052 issued to R. D. Bragg et al. on Jun. 18, 1991;
U.S. Pat. No. 5,369,944 issued to O. Robichaud on Dec. 6, 1994;
U.S. Pat. No. 5,375,403 issued to G. E. Collins et al. on Dec. 27, 1994;
U.S. Pat. No. 6,000,203 issued to L. H. Weatherbee et al. on Dec. 14, 1999;
U.S. Pat. No. 7,716,909 issued to Dario Hebert on May 18, 2010;
CA Patent 1,249,727 issued to R. D. Bragg et al. on Feb. 7, 1989;
CA Patent 1,318,135 issued to R. D. Bragg et al. on May 25, 1993.

The blueberry picking device described in U.S. Pat. No. 7,716,909 issued to Dario Hebert herein above is particularly appropriate for mounting to the front end of a small tractor. It is appropriate for mounting to the front end of a small tractor of the type that is used on commercial lawn mowers and hobby farm equipment for examples. These small tractors have a capacity between 25 and 40 hp., and a weight of about 1600-1800 lbs.

For comparison, the older blueberry harvesters such as the ones described in U.S. Pat. No. 4,862,683; U.S. Pat. No. 5,369,944 and U.S. Pat. No. 6,000,203 for examples, are mounted to larger tractors which could weight between 2500-7,000 lbs and more. The footprint pressure of these large tractors is relatively high as they are made to travel on gravel roads, hay fields in dry season and forest floors. The tire threads on the large tractors are made for traction rather than low surface pressure. The tire threads are not made to be gentle to the plants and root systems on which they travel. The V-shape threads of a farm tractor wheel for example, has aggressive thread edges that can shear the root system of blueberry plants, just from the weight of the tractor itself. It is believed that such breakage of the root systems of blueberry plants can adversely affect crop during the next season. Although blueberry plants need pruning, it is believed that damage to the deep root systems and to the creeping stems (rhizome or surface roots) of blueberry plants should be avoided to maintain good plant production.

The operation of the large blueberry harvester requires a constant forward motion by the tractor. When one of the wheel encounters an obstruction, such as a bolder, more power is applied to the wheels from the engine's governor, so that the tractor can roll over that obstruction without faltering. Every time a large torque is applied to the wheel, the sharp V-threads of the wheels are susceptible of damaging the root systems and the surface stems (rhizomes) of some blueberry plants.

The Hebert blueberry picking head (U.S. Pat. No. 7,716,909) has opened an opportunity for harvesting blueberries using lighter machines. Moreover, the Hebert picking head is operated in a repetitive back and forth movement where excessive wheel torque on the tractor is never required. If an obstruction is encountered, the natural back-and-forth rocking motion of the machine can overcome it.

Also, the smaller and lighter tractors used to operate the Hebert picking head reduce soil compaction and create less plant damage in a blueberry field. The smaller lawn-type tractors mentioned above have a low footprint pressure, for being designed to operate on lawns and gardens that are watered and aerated on a regular basis. The tires on these tractors are relatively wider and the thread pads are large and closely spaced. Plant damage is reduced by both the tires profile and a lighter tire work due to the nature of the Hebert harvesting head.

The Hebert picking head has created an opportunity for a method for harvesting a blueberry field, without applying damaging pressure to the root systems of blueberry plants.

However, these smaller machines cannot carry as many blueberry containers as the larger tractors. This reduction in carrying capacity can represent an impediment to productivity if harvesting must be interrupted to transport each full berry container to an access road at the edge of a blueberry field.

Therefore, it is believed that there is a need in the blueberry farming industry for a new method for handling berry containers with the smaller machines such that the productivity of a picking head on a small tractor is comparable to the work of the larger harvesters on large farm tractors.

SUMMARY OF THE INVENTION

In the present invention, there is provided a method for harvesting blueberries with a small tractor wherein the productivity is comparable to the larger harvesters. In the new method, the harvester carries a number of empty blueberry containers and each blueberry container is deposited on the ground in a specific way as soon as it is full. Harvesting continues in one of the empty containers. Because of this method the ground pressure of the harvester is always kept relatively low.

In a first aspect of the present invention, there is provided a method for harvesting a blueberry field comprising the steps of: carrying a number of empty blueberry containers on a four-arm lift of a blueberry harvester. Empty blueberry containers are transferred, one at the time to the right side of the four-arm lift, under the end of a longitudinal conveyor. The first empty blueberry container under the longitudinal conveyor is filled with blueberries. This first blueberry container is deposited to the ground as soon as it is full. The above steps of transferring, filling and depositing are repeated until all the empty blueberry containers are full.

In another aspect of the present invention, there is provided a method for harvesting a blueberry field, comprising the steps of: carrying a first and second blueberry containers on respective arm-pair of a four-arm lift mounted to the rear end of a blueberry harvester. The first blueberry container is filled with blueberries. The first and second blueberry containers are deposited side-by-side on the ground using the four-arm lift, as soon as the first blueberry container is full of blueberries. The present method also includes the steps of manoeuvring the blueberry harvester forward and backward and selectively picking up the second blueberry container with the right side of the four-arm lift; raising the second blueberry container under the longitudinal conveyor, leaving the first blueberry container on the ground, and filling the second blueberry container with blueberries.

In yet another aspect of the present invention, the method of harvesting a blueberry field as described above includes the step of moving backward and away from a harvesting stop line, depositing the full blueberry container and one empty container side-by-side on the ground, picking up the empty container and raising it under the longitudinal conveyor and moving forward to the last harvesting stop line. The step of depositing is effected at a distance from an unharvested area of the blueberry field that is farther away from the last harvested strip than the width of the harvester.

The space left between the full blueberry container deposited on the ground and the last harvested strip in the blueberry field provides space for the harvester to reposition itself to pick up the empty container without running over any unharvested area of the blueberry field. Furthermore, the depositing of a full container and the picking up of an empty container under the longitudinal conveyor is effected without turning the harvester around. The steps of depositing and picking up are done with minimal steering in the field.

Because of the low footprint pressure of the smaller tractor; the lighter tire work associated with the Hebert picking head; the load limitation of only one full container, and the minimum steering during manoeuvring the harvester to deposit a full container and to pick up an empty one, there is less damage done to the root systems of blueberry plants in a blueberry field. Production of blueberry plants can only be improved.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the method according to the present invention is described with the aid of the accompanying drawings, in which like numerals denote like parts throughout the several views, and in which:

FIGS. 4-7 illustrate four plan views of the small blueberry harvester representing four different steps in the present method for harvesting a blueberry field and for handling blueberry containers in a blueberry field.

DESCRIPTION OF THE PREFERRED EMBODIMENT

Figure 1:
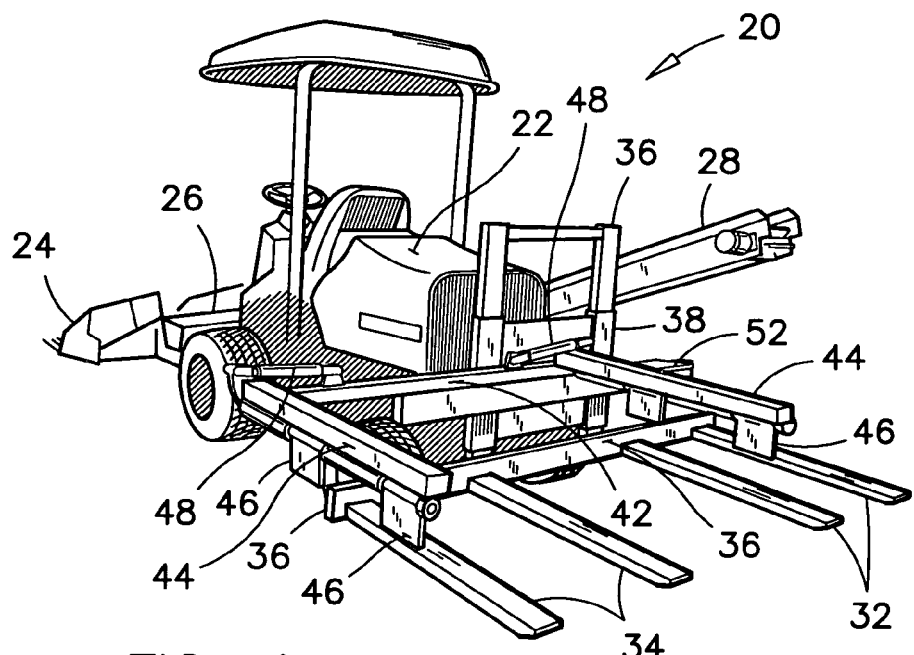
FIG. 1 is a perspective rear view of the small blueberry harvester used in the present method for harvesting a blueberry field and for handling blueberry containers when harvesting a blueberry field.
Figure 2:
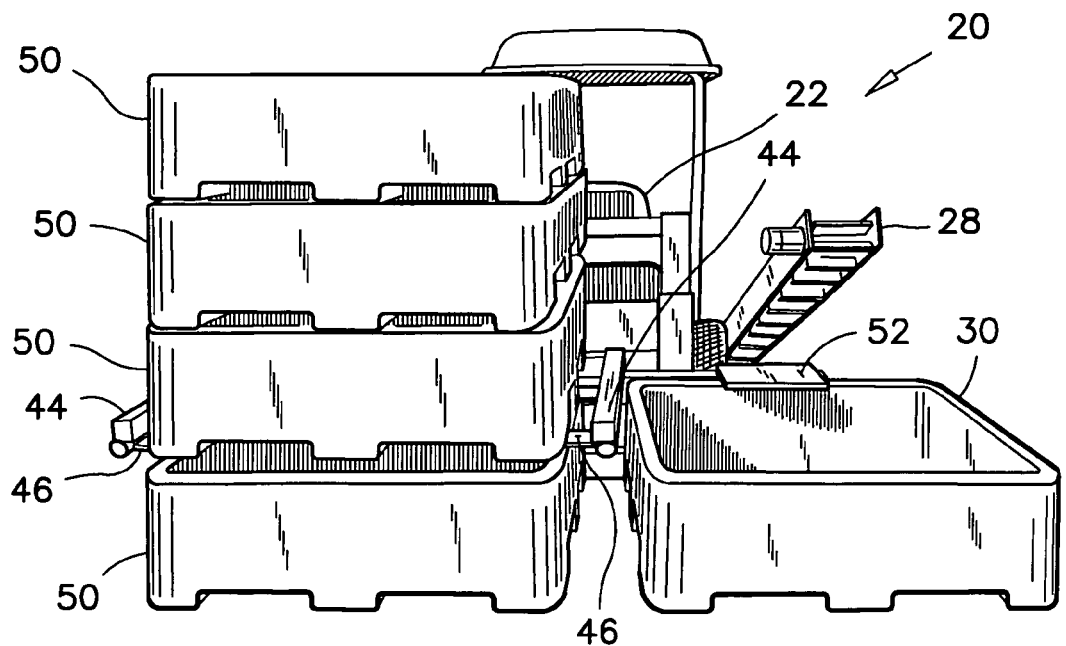
FIG. 2 is a rear view of the small blueberry harvester with blueberry containers loaded thereon.
Figure 3:
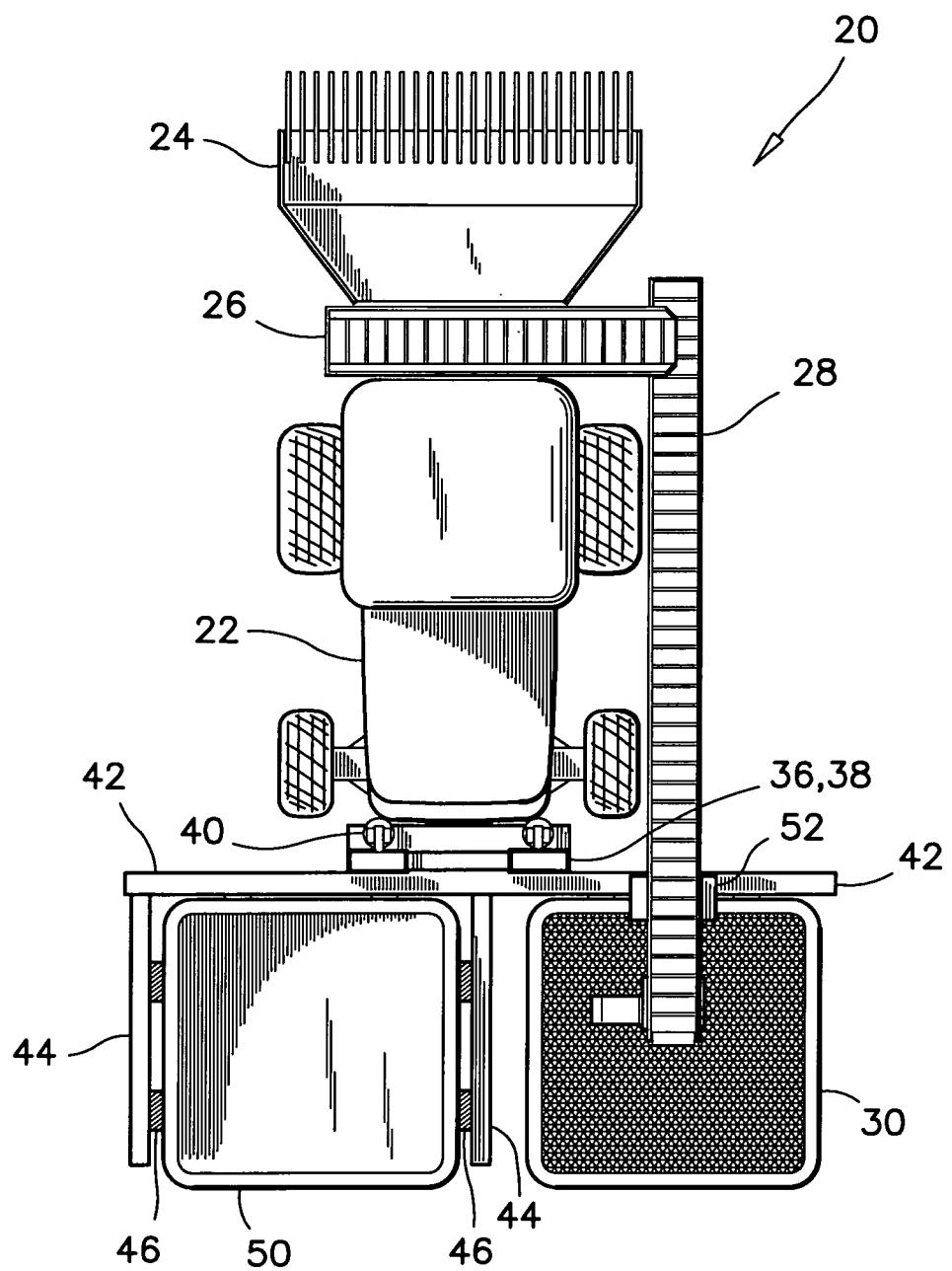
FIG. 3 is a plan view of the small blueberry harvester with containers loaded thereon.

Referring to FIGS. 1, 2 and 3, the preferred blueberry harvester 20 will be described. The tractor used in the preferred blueberry harvester 20 is a relatively small tractor 22 of the type that is used on commercial lawn mowers for example. Examples of such smaller tractors suitable for the present application are Kubota tractors, models F3680 and F3990.

The footprint pressure of these tractors is designed to be less that the strength of a sod layer that has been watered, fertilized and aerated regularly. Even with the added load of a lawn mower deck or a small backhoe, the footprint pressure is less that the strength of a common lawn surface. The tires on these tractors are relatively wide and the thread surfaces are relatively smooth.

A preferred blueberry picking head for mounting on the preferred harvester 20 is the comb-type Hebert picking head 24 as described in U.S. Pat. No. 7,716,909. A transverse conveyor 26 is mounted between the tractor 22 and the picking head 24. The transverse conveyor 26 has a discharge end over the front end of a longitudinal conveyor 28. The longitudinal conveyor 28 extends to the side of the tractor 22 and ends up over a berry receiving container 30, supported on a pair of lower arms on the rear end of the tractor 22.

As mentioned above, the rear end of the tractor 22 has a four-arm fork lift assembly mounted thereon. The fork lift assembly has four arms forming two pairs of lower arms 32, 34 that are mounted side-by-side to a common raisable frame 36. The lower arms 32, 34 extend horizontally backward relative to the tractor 22 and are movable in unison.

The common raisable frame 36 and the lower arms 32, 34 are movable up and down in a fixed vertical telescopic slide 38. The fixed vertical slide 38 is attached to the tractor 22. The movement of the lower arms 32, 34 and of the common raisable frame 36 relative to the fixed vertical slide 38 is effected by one or more hydraulic cylinders 40 as shown in FIG. 3. The lower arms 32, 34 are movable vertically from the ground surface to a distance equivalent to about the height of a blueberry container 30.

The fixed vertical telescopic slide 38 has a crossbar 42 mounted thereto. A pair of upper arms 44 extends horizontally backward from the crossbar 42 substantially above the pair of lower arms 34. The upper arms 44 are fixed relative to the lower arms 34. The upper arms 44 remain at a same height when the lower arms 32, 34 move up or down.

Each upper arm 44 has a pair of movable flaps 46 mounted and articulated thereto. The flaps 46 are operable by hydraulic cylinders 48, from a vertical position as shown in FIG. 1, to a horizontal position as illustrated in FIGS. 2 and 3. As it will be understood from the illustration in FIG. 2, the flaps 46 are operable to retain a stack of empty blueberry containers 50 above the lower arms 34, and to selectively release one empty container 50 at the time onto the pair of lower arms 34 under the stack of containers. In use, the empty berry containers 50 are stacked by hand on the upper arms 44 with the flaps 46 in a horizontal locking position.

In a harvesting operation, the berries picked up by the picking head 24 are dumped into the transverse conveyor 26. The berries are moved along the transverse conveyor 26 and into the longitudinal conveyor 28. The longitudinal conveyor 28 discharges the berries into the receiving container 30 resting on the right side forks 32 of the four-arm lift assembly of the harvester 22. This operation can be better understood when referring to FIG. 3.

While blueberries are being collected into the receiving container 30 resting on the right side lower arms 32 of the harvester 20, the stack of empty berry containers 50 is carried on the left side lower arms 34, and on the upper arms 44 above the left side lower arms 34.

The receiving container 30 is raised on the lower arms 32 until a forward segment of its rim is caught as a cantilever under a retaining flap 52. This flap is affixed to the crossbar 42 as can be seen in FIGS. 1, 2 and 3.

In normal crops, a stack of four (4) empty containers 50 with one (1) receiving container 30 provide sufficient space for collecting berries across blueberry fields classified as medium size to large fields. During each "run", the harvester 20 carries the load of the empty containers 50 plus the load of the partially full receiving container 30. When the receiving container 30 is full, it is released to the ground as it will be explained later. Therefore, the harvester 20 is never loaded in excess of one full berry container 30 plus four empty ones 50.

The blueberry containers 30, 50 that are mentioned and illustrated herein have a capacity of about 12-14 cu ft. A container of that size full of berries can weigh in excess of five hundred pounds (500 lbs). Therefore, a full berry container 30 is deposited to the ground as soon as it is full in order to maintain a safe tractor footprint pressure.

A safe footprint pressure of a tractor used in the harvesting of blueberries, is defined as the pressure that is less than the support strength of the surface bushes and root systems of the blueberry plants in a blueberry field.

In the method according to the preferred embodiment, any excessive soil loading pressure is prevented by discharging the receiving blueberry container 30 as soon as it is full. Relatively speaking, the weight of the empty containers 50 are negligible for corresponding to the weight of a lawn mower deck, a garden tiller or a similar tractor accessory. The weight of such tractor accessory is included in the design of the tires of the preferred tractor 22 such that the footprint pressure of the tractor with accessory is a safe one for soft lawn surfaces.

Referring now to FIGS. 4-7, the preferred method of handling berry containers will be described. In FIG. 4, the preferred small harvester 20 is illustrated working a blueberry field 60 one strip 62 at the time. The movement of the harvester 20 can be understood as moving in a counter clockwise direction relative to the blueberry field 60, where the cross-hatched area 64 represents an unharvested area, and the unmarked area 66 represents a harvested area.

When the receiving container 30 is full of blueberries, the harvester 20 backs away from its last harvesting stop line 68 in the blueberry field 60, in the direction of arrow 70 in FIG. 4. During the backing up along the arrow 70, the harvester 20 moves away from the last harvester strip 62 a distance of about at least one full width of the harvester 20 into the harvested area 66 of the blueberry field. This way, the full blueberry container 30 is deposited to the ground in a location that will not hinder the harvesting of a subsequent strip 62 in the unharvested area 64 of the blueberry field.

Referring now to FIG. 5, the harvester 20 having backed up along the arrow 70, the harvester operator lowers the lower arms 32, 34 to the ground, and moves the harvester 20 in a forward direction along arrow 72, as illustrated in FIG. 5. The result of this movement is that both the full berry container 30 and the lowermost empty container 50 are deposited side-by-side on the ground.

The harvester 20 can now be moved backward again in the direction of arrow 74 in FIG. 6. During this backward movement, the harvester 20 is also moved sideways a half-width of the harvester toward the last harvested strip 62. During this backward movement, the lowermost empty berry container 50' that was left on the ground is picked up over the right side lower arms 32, and raised under the conveyor 28. That berry container 50' becomes the next receiving container 30.

Having a receiving container 30 on the right side lower arms 32, the harvester 20 can now be repositioned along the strip 62, along arrow 76 in FIG. 7, and resumes harvesting from its last position 68, without having driven over any unharvested area. Also, the harvester 20 is moved from its last harvesting stop line 68 and back to its last harvesting stop line 68 without having to turn about and gouge the soil with hard steering as it is the case with large harvesters during their turning around in a blueberry field.

The full receiving blueberry container 30 is left on the field for pick up by a dedicated fork lift tractor. This fork lift tractor (not shown) picks the full blueberry containers 30 and carry them to a flat bed truck or a trailer for example at the edge of the field. The fork lift tractor (not shown) is preferably a front end loader tractor for example. Again, the footprint loading of that fork lift tractor is also minimal for carrying only one full container at the time.

In summary, the method for harvesting a blueberry field according to the preferred embodiment of the present invention is described as follows:

providing a small and light-weight harvester 20 with a comb-type blueberry picking head 24;

loading a receiving container 30 on a first pair 32 of lower arms of a four-arm lift assembly on the harvester 20;

loading several empty containers 50 on a second pair 34 of lower arms on the four-arms lift assembly;

harvesting a blueberry field in a counterclockwise direction from the outside in, defining a harvested area 66 outside the field and a unharvested area 64 in the central area of the field;

harvesting blueberries and filling the receiving container 30 with blueberries;

moving the harvester 20 backward from a harvesting stop line 68 and sideways to the right, away from a last harvested strip 62;

lowering and depositing the receiving container 30 and one empty container 50 on the ground side-by-side in the harvested area 66;

manoeuvring the blueberry harvester 20 forward, leaving the empty container 50' and the full receiving container 30 on the ground;

manoeuvring the harvester 20 backward and sideways with the first and second pairs of lower arms 32, 34 in a lower position, and picking up the empty container 50' on the first pair of lower arms 32;

moving the blueberry harvester 20 forward and sideways to the left to the last harvesting stop line 68, leaving the full container 30 on the ground;

resuming harvesting of blueberries and filling the empty container 50' on the first pair of lower arms 32 with blueberries; and repeating the steps of depositing the receiving container 30 on the ground, manoeuvring and picking an empty containers 50', until all the empty containers 50 on the second pairs of arms have been filled with blueberries.

The transfer of an empty container 50' under the longitudinal conveyor 28 can be effected in about one minute or so. The harvester 20 has minimum downtime so that productivity of the smaller harvester 20 is as high as other more conventional harvesters. The harvester 20 maintains a foot print loading that is very small as compared to the harvesters of the prior art.

What is claimed is:

1. A method for harvesting a blueberry field comprising the steps of:
   providing a blueberry harvester with a comb-type blueberry picking head mounted to the front end thereof;
   carrying a number of empty blueberry containers above a first pair of lower arms on the back end of said blueberry harvester;
   releasing a first blueberry container onto said first pair of lower arms;
   transferring said first blueberry container onto a second pair of lower arms on said back end of said blueberry harvester; said step of transferring comprising the steps of operating said first and second pairs of lower arms in unison; depositing said first container from said first pair of lower arms to the ground; manoeuvring said blueberry harvester forward and backward and picking up said first container from the ground onto said second pair of lower arms;
   selectively releasing another blueberry container from said number of empty blueberry containers onto said first pair of lower arms;
   filling said blueberry container on said second pair of lower arms with blueberries; and
   repeating said steps transferring, including depositing said blueberry container on said second pair of lower arms on the ground as soon as said blueberry container is full, said step of selectively releasing, filling and depositing with each one of said number of empty blueberry containers.

2. The method for harvesting a blueberry field as claimed in claim 1, wherein said step of carrying a number of empty blueberry containers comprises the step of carrying five empty blueberry containers.

3. The method for harvesting a blueberry field as claimed in claim 1, wherein said step of selectively releasing another blueberry container comprises the step of releasing another blueberry container from a stack of empty blueberry containers.

4. The method for harvesting a blueberry field as claimed in claim 1, wherein said step of manoeuvring further includes the step of backing away from a last harvesting stop line, and moving forward toward said last harvesting stop line.

5. The method for harvesting a blueberry field as claimed in claim 4, wherein said step of backing away included the step of steering in a right direction a distance equivalent to at least a width of said harvester.

6. The method for harvesting a blueberry field as claimed in claim 1, wherein said step of selectively releasing includes the steps of retaining said number of empty blueberry containers on upper arms with movable flaps above said first pair of lower arms, raising said lower arms a distance equivalent to a height of one of said empty blueberry; operating said flaps from horizontal positions to a vertical positions for releasing a lowermost one of said empty blueberry containers onto said first pair of lower arms, and operating said flaps again from said vertical positions to said horizontal positions for retaining said empty blueberry containers remaining to said upper arms.

7. The method for harvesting a blueberry field as claimed in claim 1, further including the step of harvesting said blueberry field in a counterclockwise direction.

8. The method for harvesting a blueberry field as claimed in claim 1, wherein said step of depositing and picking comprise the steps of moving away from a last harvested strip and moving toward a last harvested strip without turning said harvester around.

9. The method for harvesting a blueberry field as claimed in claim 1, wherein said steps of carrying and filling are effected with a blueberry harvester comprising a small lawn-type tractor weighing 1600-1800 lbs.

10. The method for harvesting a blueberry field as claimed in claim 9, wherein each of said blueberry containers have a volume of 12-14 cubic feet.

11. A method for handling blueberry containers when harvesting a blueberry field, comprising the steps of:
    carrying a first and second blueberry containers on respective first and second arm pairs of a four-arm lift of a blueberry harvester;
    filling said first blueberry container with blueberries while said first blueberry container rests on said first arm pair;
    depositing said first and second blueberry containers on the ground side-by-side using said four-arm lift as soon as said first blueberry container is full of blueberries;
    selectively, picking up said second blueberry container by said first arm pair and leaving said first blueberry container on the ground; and
    filling said second blueberry container with blueberries.

12. The method for handling blueberry containers as claimed in claim 11, further including the step of carrying four empty blueberry containers on said second arm pairs.

13. The method for handling blueberry containers as claimed in claim 11, wherein said steps of depositing and picking up comprising the step of repositioning said harvester to one side of said first blueberry container.

14. The method for handling blueberry containers as claimed in claim 13, wherein said step of depositing is effected at a distance equivalent to the width of said harvester from an unharvested area of said blueberry field.

15. The method for handling blueberry containers as claimed in claim 11, further including the step of moving said harvester backward and away from a harvesting stop line prior to said step of depositing, and moving back said harvester to said last harvesting stop line after said step of picking up.

16. The method for handling blueberry containers as claimed in claim 11, wherein said step of depositing is effected at a distance that is larger than a width of said harvester from an unharvested area of said blueberry field.

17. The method for handling blueberry containers as claimed in claim 11, wherein said steps of depositing and picking comprise the steps of backing away from a last harvesting stop line and forward to said last harvesting stop line.

18. A method for harvesting a blueberry field comprising the steps of:
    supporting a first and second blueberry containers on a four-arm lift assembly mounted to the rear end of a blueberry harvester;
    filling said first blueberry container with blueberries;

depositing said first and second blueberry containers on the ground side-by-side using said four-arm lift assembly as soon as said first blueberry container is full of blueberries;

selectively picking up said second blueberry container with said four-arm lift without turning said blueberry harvester around, leaving said first blueberry container on the ground; and filling said second blueberry container with blueberries.

19. The method for harvesting a blueberry field as claimed in claim 18, wherein said steps of depositing and selectively picking up include the steps of backing away from a last harvesting stop line and moving forward toward said last harvesting stop line.

20. The method for harvesting a blueberry field as claimed in claim 19, wherein said step of backing away included the step of steering in a right direction a distance equivalent to at least a width of said harvester.

* * * * *